Figure 1:
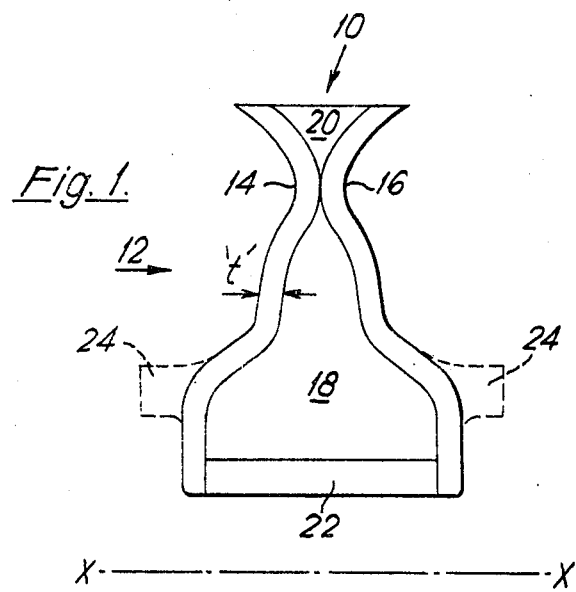

United States Patent [19]
Bird

[11] 3,973,875
[45] Aug. 10, 1976

[54] TURBINE DISCS AND BLADES FOR GAS TURBINE ENGINES

[75] Inventor: Jack Raymond Bird, Chellaston, England

[73] Assignee: Rolls-Royce (1971) Limited, London, England

[22] Filed: Jan. 28, 1975

[21] Appl. No.: 544,769

[30] Foreign Application Priority Data
Feb. 9, 1974 United Kingdom............... 6004/74

[52] U.S. Cl........................ 416/241 B; 416/244 A
[51] Int. Cl.²........................................ F01D 5/28
[58] Field of Search............. 416/244, 244 A, 241 B, 416/241, 241 A, 224, 229 A; 29/156, 8 B

[56] References Cited
UNITED STATES PATENTS

| | | | |
|---|---|---|---|
| 2,783,966 | 3/1957 | Sorensen........................ | 416/241 B |
| 3,222,438 | 12/1965 | Parr et al........................ | 416/244 X |
| 3,664,766 | 5/1972 | Rahnke........................... | 416/244 |
| 3,854,189 | 12/1974 | Ezis et al......................... | 29/420 |
| 3,881,845 | 5/1975 | Hauck............................. | 416/241 |
| 3,887,411 | 6/1975 | Goodyear et al................. | 416/241 |
| 3,892,835 | 7/1975 | Holdsworth...................... | 264/332 |
| 3,900,668 | 8/1975 | Olcott............................. | 428/297 |
| 3,905,723 | 9/1975 | Torti............................... | 416/241 B |

FOREIGN PATENTS OR APPLICATIONS
694,170   7/1953   United Kingdom............ 416/241 B

*Primary Examiner*—Everette A. Powell, Jr.
*Attorney, Agent, or Firm*—Cushman, Darby & Cushman

[57] ABSTRACT

A rotor for a gas turbine engine comprises an outer shell formed in hot pressed silicon nitride and having substantially uniform thickness in a direction parallel to the axis about which the rotor is rotatable and a heat resistant insert which can be either graphite or reaction sintered silicon nitride which fills the space within the shell and is attached to the shell. A row of blades which can be either hot pressed or reaction sintered silicon nitride can be attached to the periphery of the rotor by diffusion bonding.

5 Claims, 7 Drawing Figures

TURBINE DISCS AND BLADES FOR GAS TURBINE ENGINES

The present invention relates to turbine discs and blades for gas turbine engines, the discs and blades being manufactured from a ceramic material such as silicon nitride.

Turbine discs and blades can be readily made from the reaction sintered form of silicon nitride by machining the parts from a solid block since this form of silicon nitride is relatively easy to machine. However, because this form of silicon nitride is considerably less dense than the maximum theoretical density, it is relatively weak and is not suitable for use in turbine discs where stresses may be of the order 50,000 p.s.i.

In order to overcome this problem the hot pressed form of silicon nitride can be used because it can be pressed to almost maximum theoretical density and is therefore considerably stronger.

However, it is not practical to machine a turbine disc and blades from a block or blocks of silicon nitride because the hot pressed form of the material is difficult and therefore expensive to machine.

The disc and/or blades can be hot pressed to shape in a mould but because of the differing sectional thicknesses of these parts the density and therefore the strength will vary with thickness throughout the part.

The present invention seeks to provide a turbine disc and a bladed turbine wheel construction and a method of making the same which overcomes these problems.

The present invention provides a rotor for a gas turbine engine, the rotor comprising an outer shell formed from hot pressed silicon nitride at least one heat resistant insert which substantially fills the space within the shell, the shell being formed by two shell portions, the sectional thickness of which is substantially constant in a direction parallel to the axis about which the rotor is rotatable.

The insert may be graphite or a ceramic material such as reaction sintered silicon nitride and the reaction sintered silicon nitride may be diffusion bonded to the hot pressed silicon nitride shell.

A ring of hot pressed silicon nitride may also be provided and secured to the shell portions and to the radially innermost face of the insert.

According to the shape of the rotor a further insert may be provided to fill in the space between the radially outermost portions of the shell. As before the further insert may be formed from graphite or reaction sintered silicon nitride.

In the case where a row of blades is to be secured to the rotor, the row of blades may be formed from reaction sintered silicon nitride and the further insert can be formed integrally with the blade row.

In an alternative arrangement, the blade row can be formed in hot pressed silicon nitride and the further insert formed and bonded to the blade row in a moulding operation.

In a further arrangement, the blade row and rotor can be formed separately and joined together by slip casting silicon powder between the blade row and rotor and nitriding the silicon to form a reaction sintered silicon nitride bond between the blade row and rotor.

In order that the rotor can be located with a shaft or an adjacent rotor, locating features such as dogs or couplings of the 'CURVIC' type may be formed integrally with the shell.

The invention further provides a method of making a rotor as described above, the method comprising forming the insert with external surfaces which correspond with the internal surfaces of the shell, placing the formed insert in a graphite die which has two die portions whose working surfaces correspond to the external surfaces of the shell to be formed, filling the spaces between the said die portions and insert with a predetermined quantity of silicon nitride powder and a densifying agent and applying heat and pressure to densify the silicon nitride powder.

Preferably the method of hot pressing the silicon nitride powder is that described in U.K. Pat. No. 970,639.

In the case where a reaction sintered insert is used, the insert and shell portions will become diffusion bonded to one another in the pressing operation.

Where a further insert is required, the further insert is also placed in the mould with the first insert.

Also where the ring of hot pressed silicon nitride is required this is also placed in the mould with the insert or inserts prior to pressing.

Figure 2:
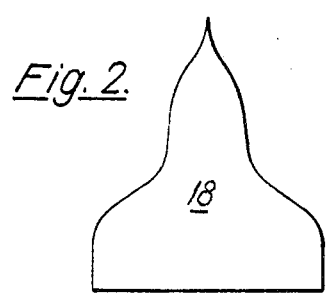
Figure 4:
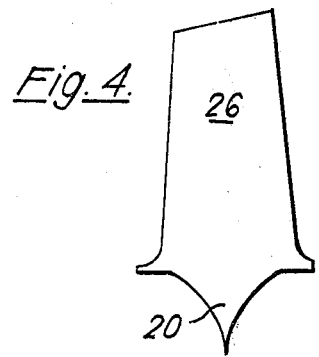
Figure 3:
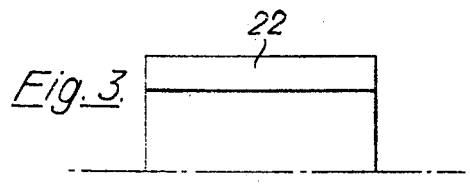
Figure 5:
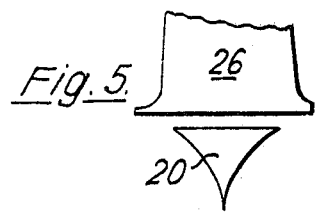
Figure 6:
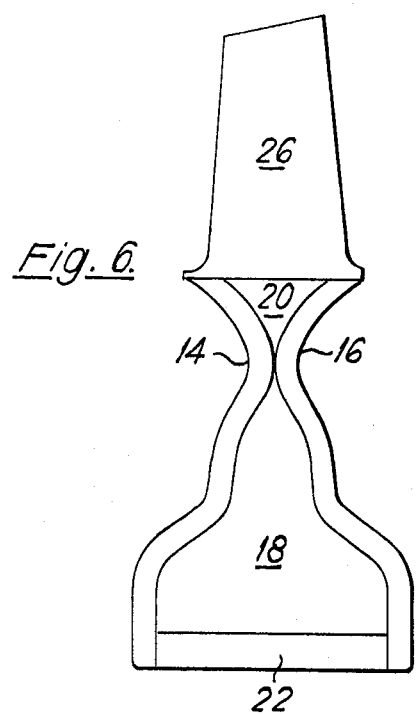
Figure 7:
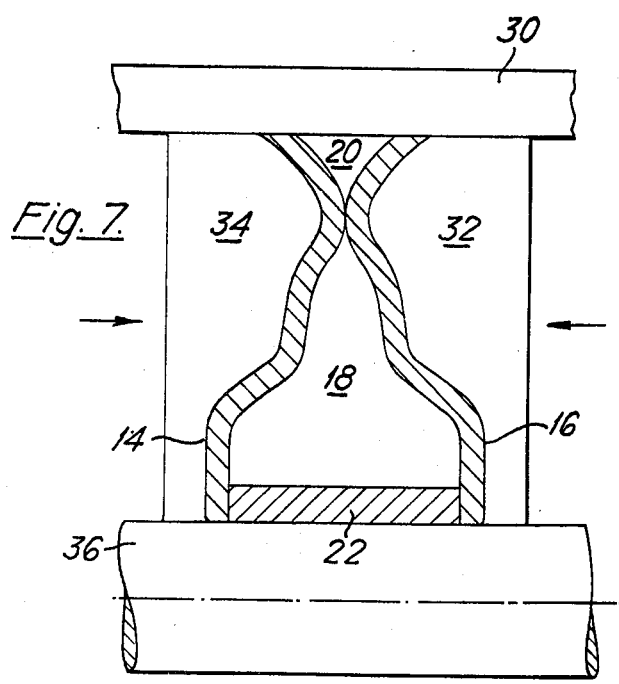

The present invention will now be more particularly described with reference to the accompanying drawings in which:

FIG. 1 shows one form of rotor according to the present invention,
FIG. 2 shows the insert of FIG. 1,
FIG. 3 shows the inner ring of FIG. 1,
FIG. 4 shows a blade and integral further insert,
FIG. 5 shows a separate blade and further insert,
FIG. 6 shows a complete rotor and blade row assembly, and
FIG. 7 shows a mould and illustrates the method of making the rotor shown in FIG. 1.

Referring to the Figs., a rotor 10 for a gas turbine engine (not shown) comprises a shell 12 formed from two shell portions 14 and 16, the shell portions being formed in hot pressed silicon nitride according to the method described in U.K. Pat. No. 970,639. The sectional thickness $t$ of the shell portions is constant in a plane which is parallel to the axis X—X about which the rotor is rotatable. By keeping the dimension $t$ constant, the shell portions can be formed with uniform density and therefore uniform strength.

Enclosed within the shell are an annular insert 18 and a further annular insert 20 which may be dispensed with according to the design of the rotor and the shell thickness, i.e. the inserts 18 and 20 can be made as one piece if the wall thickness is reduced. The inserts 18 and 20 can be machined from graphite but preferably they are machined from reaction sintered silicon nitride since this material can be diffusion bonded to the shell during manufacture of the shell as will be described with reference to FIG. 7.

An inner ring 22 of hot pressed silicon nitride is attached between the radially innermost parts of the shell and to the insert 18.

In order that the rotor 10 can be coupled to an adjacent rotor or a shaft, locating features 24 such as dogs or couplings of the CURVIC type can be formed integrally with the shell portions.

FIG. 4 shows a blade which is part of a blade row formed integrally with the further insert 20. The blade row and further insert are formed from reaction sintered silicon nitride and the blade row can be incorporated with the rotor during manufacture of the shell portions.

In FIG. 5 the blade row is formed separately from the further insert and can be formed in either reaction sintered or hot pressed silicon nitride. The further insert is incorporated within the rotor during manufacture of the shell portions and the blade row is attached to the rotor by slip casting silicon powder between the blade row and rotor and nitriding the silicon powder.

FIG. 6 shows a completed rotor and blade row.

Referring to FIG. 7, a mould comprises a graphite cylinder 30, two annular die portions 32,34 which are mounted on a central spigot 36, the diameter of which corresponds to the bore of the rotor 10. Means for applying heat to the mould, such as an induction coil and means for applying pressure to the die portions such as an hydraulic press are provided but are not shown.

The inserts 18 and 20 are first formed in a separate process from reaction sintered silicon nitride and machined to shape, the surfaces of the inserts being shaped to conform with the internal surfaces of the shell portions 14,16.

The formed inserts are placed within the graphite cylinder over the die portion 34 and a predetermined quantity of silicon nitride powder and densifying agent is placed between the inserts and the die portion 34. The ring 22 is placed over the spigot 36 and further predetermined quantity of silicon nitride powder and densifying agent is placed over the inserts 18,20 and the die portion 32 is moved into position. The mould is heated to about 1,850°C and pressure of 1,200 p.s.i. is applied to the die portions 32,34 until the silicon nitride powder densifies to form the shell portions 14,16. During the pressing operation the inserts 18,20 and the ring 22 will become diffusion bonded to the shell portions 14,16 as they are being moulded.

The densifying agent which is used is preferably magnesium oxide in the ratio 1 part magnesium oxide to 20 parts silicon nitride powder.

As has been described, the blade row can be moulded into the rotor during the manufacture of the shell portions and this can be achieved by providing a suitable form of mould.

Also the locating features can be moulded integrally with the shell portions by the use of separately actuatable die portions which may be operated independently of the die portions 32,34.

What we claim is:

1. A rotor for a bladed gas turbine engine, the rotor including a hub portion comprising an outer shell formed from hot pressed silicon nitride and at least one heat resistant insert which substantially fills the space within the shell and which has a lower strength then said shell, said heat resistant insert being attached to the shell, the shell being formed by two shell portions, and each of said shell portions having a thickness which is substantially constant in a direction parallel to an axis about which the rotor is rotatable.

2. A rotor as claimed in claim 1 in which the shell portions abut each other at one point and two heat resistant inserts are provided to fill the spaces between the shell portions, the inserts and the shell portions being attached together.

3. A rotor as claimed in claim 1 having a ring of hot pressed silicon nitride attached to the radially innermost faces of the shell and the insert.

4. A rotor as claimed in claim 1 having a row of blades formed from silicon nitride attached to the periphery of the rotor.

5. A rotor as claimed in claim 1 in which the insert is formed from reaction sintered silicon nitride and the shell portions are attached to the insert by diffusion bonding.

* * * * *